(12) United States Patent
Neisz

(10) Patent No.: US 9,791,556 B2
(45) Date of Patent: Oct. 17, 2017

(54) RANGE GENERATION USING MULTIPLE ANALOG RAMPS

(71) Applicant: Raytheon Company, Waltham, MA (US)

(72) Inventor: James H. Neisz, Waltham, MA (US)

(73) Assignee: Raytheon Company, Waltham, MA (US)

( * ) Notice: Subject to any disclaimer, the term of this patent is extended or adjusted under 35 U.S.C. 154(b) by 801 days.

(21) Appl. No.: 14/299,978

(22) Filed: Jun. 9, 2014

(65) Prior Publication Data

US 2017/0102455 A1    Apr. 13, 2017

(51) Int. Cl.
*G01S 7/486*    (2006.01)
*G01S 17/10*    (2006.01)

(52) U.S. Cl.
CPC ............ *G01S 7/4865* (2013.01); *G01S 17/10* (2013.01); *G01S 17/107* (2013.01)

(58) Field of Classification Search
CPC ....... G01S 7/4865; G01S 17/10; G01S 17/107
See application file for complete search history.

(56) References Cited

U.S. PATENT DOCUMENTS

| | | | | | |
|---|---|---|---|---|---|
| 2,724,817 | A | * | 11/1955 | Hisserich | G01S 13/343 367/102 |
| 3,005,335 | A | * | 10/1961 | Erdman | G01N 29/0645 315/379 |
| 3,668,529 | A | * | 6/1972 | Meyer | G04F 10/105 327/31 |
| 3,798,590 | A | * | 3/1974 | Jacobson | G01S 13/34 342/189 |
| 3,905,033 | A | * | 9/1975 | Moore | G01S 13/282 342/132 |
| 5,077,702 | A | * | 12/1991 | Whyland | G01S 15/104 367/100 |
| 5,212,490 | A | * | 5/1993 | Nelson | G01S 13/34 327/185 |
| 9,465,108 | B1 | * | 10/2016 | Grimmett | G01S 7/536 |
| 2005/0110976 | A1 | * | 5/2005 | LaBelle | G01C 3/08 356/5.01 |
| 2009/0273500 | A1 | * | 11/2009 | Krymski | H03M 1/144 341/155 |
| 2017/0102455 | A1 | * | 4/2017 | Neisz | G01S 7/4865 |

* cited by examiner

*Primary Examiner* — Daniel Pihulic

(57) ABSTRACT

A technology is provided for determining a range of a target using multiple analog ramps. A slow ramp voltage level can be identified that indicates an approximate arrival time for a light pulse to be received as a target reflection after propagating towards the target. A slope number associated with the slow ramp voltage level can be identified, wherein the slope number is an integer ranging from 0 to N. An adjusted slope number can be calculated using the slope number and fast ramp information. A coarse range and a fine range of the target can be determined using the adjusted slope number. The range of the target can be calculated by adding the coarse range and the fine range.

22 Claims, 6 Drawing Sheets

*Assumes the Following are Defined:*

- Minimal Distance Transition Table (Rows = new zone; Cols = old zone)
  zoneUpdate = [ 0, -1, 2, 1; ...
                 1, 0, -1, 2; ...
                 2, 1, 0, -1; ...
                 -1, 2, 1, 0];

- oldSlopeID -- A matrix containing the slow ramp estimate of the Slope ID

- sensorDescr.ctrFast1 -- The center point of fast ramp 1

- sensorDescr.ctrFast2 -- The center point of fast ramp 2

*Produces the Following:*

- newSlopeID -- A matrix containing the corrected Slope ID

*FIG. 5A*

```
% Process All Pixels and Returns in Array
for rtnNdx = 1 : number_of_returns,
  for rowNdx = 1 : number_of_rows,
    for colNdx = 1 : number_of_columns,
      % Do not update if a no return pixel (i.e., maximum slope ID)
      if oldSlopeID == maxSlopeID
        newSlopeID(rowNdx,colNdx,rtnNdx) = oldSlopeID;
        continue
      end % Calculate Current Zone - No interpolation at this time
      curZone  = mod(oldSlopeID,4);

% Calculate Fast Ramp Distances from Center
      sDistFast1 = rawData(rowNdx,colNdx,MMSS_FAST_RAMP1(rtnNdx)) - ...
                   sensorDescr.ctrFast1;
      sDistFast2 = rawData(rowNdx,colNdx,MMSS_FAST_RAMP2(rtnNdx)) - ...
                   sensorDescr.ctrFast2;

% Calculate "Correct" Zone
      if abs(sDistFast1) <= abs(sDistFast2)
        if sDistFast2 < 0
          newZone = 0;
        else
          newZone = 2;
        end
      else
        if sDistFast1 < 0
          newZone = 3;
        else
          newZone = 1;
        end
      end % Update Old Slope ID for New Zone Based Upon Minimum Distance and Limit
      to Valid Slope IDs
      newSlopeID(rowNdx,colNdx,rtnNdx) = oldSlopeID + ...
                          zoneUpdate(newZone,curZone);
      newSlopeID(rowNdx,colNdx,rtnNdx) = max(0, min(newSlopeID, maxSlopeNum));

end  % for all columns
  end  % for all rows
end  % for all returns
```

*FIG. 5B*

RANGE GENERATION USING MULTIPLE ANALOG RAMPS

BACKGROUND

Light Detection and Ranging (LIDAR), also known as Laser Detection and Ranging (LADAR), is a technology used to determine a range (or distance) to an object. Likewise, a distance to the Earth's surface can be determined using a LIDAR system. The LIDAR system can be installed on an aircraft, such as an airplane or helicopter, and used to determine the range to the object or the Earth's surface. In one example, the LIDAR system can transmit light in the form of a pulsed laser to the object, and then receive the transmitted light reflected from the object. The range can be calculated based on the amount of time taken to receive the light reflected from the object. LIDAR can offer several advantages over other remote sensing technologies, such as Radio Detection and Ranging (RADAR), which uses radio waves to determine the range, altitude, direction or speed of objects. For example, light reflected from non-conductive objects can be transparent to radio waves. In addition, the coherent beam of monochromatic light produced can facilitate detection and measurement of objects over relatively longer distances.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 5A and 5B are examples of pseudo code for determining a range of a target using multiple analog ramps in accordance with an embodiment of the present invention.

Figure 1:
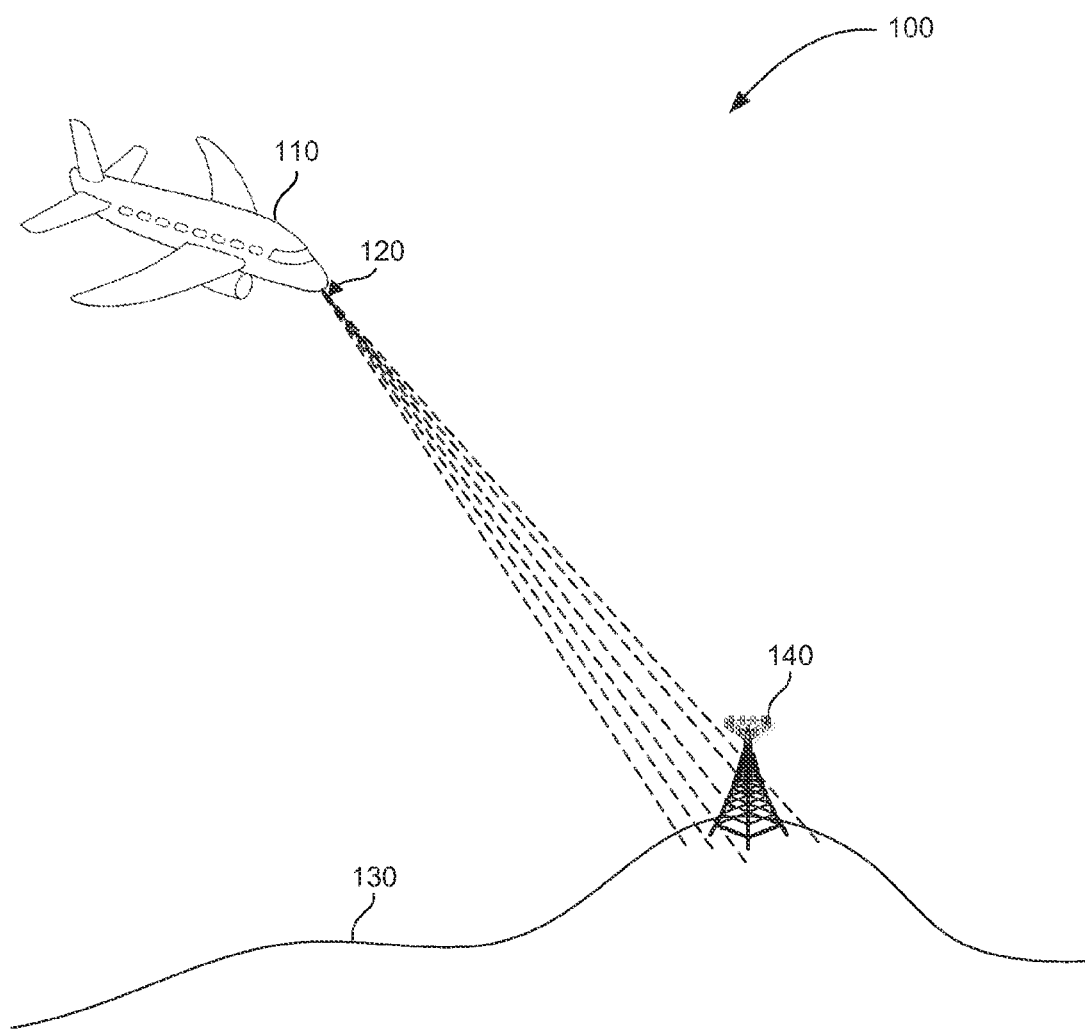
FIG. 1 is an example illustration of an aircraft using laser detection and ranging (LADAR) to determine a range of an object on the Earth's surface in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Light Detection and Ranging (LIDAR), also known as Laser Detection and Ranging (LADAR), is a remote sensing technology that measures distance by illuminating a target with a laser and analyzing the reflected light from the target. The terms "LIDAR" and "LADAR" can be used interchangeably throughout the specification. In general, the term LIDAR derives from the combination of "light" and "radar." In one example, a LIDAR system can use a laser to direct a beam of light (also known as a light pulse) to the target (e.g., the ground, objects, rocks, clouds). The LIDAR system can be installed on an aircraft, such as an airplane or helicopter. The beam of light can be reflected back to the aircraft upon striking the target.

The LIDAR system can include a sensor that detects the reflected beam of light and measures the amount of time taken for the reflected beam of light to travel back to the aircraft. The light can be reflected via backscattering and can include ultraviolet, visible, or near infrared light. In addition, the LIDAR system can calculate the distance (or range) of the target using the amount of time (i.e., the amount of time between the laser/light emission and the returned beam of light received at the sensor). In particular, the LADAR system can calculate the distance (or range) of the target by dividing the amount of time (in seconds) by 2c, wherein c is the speed of light (or approximately $3 \times 10^8$ meters per second).

In one example, the LIDAR system can calculate the range of a plurality of points on the Earth's surface. The range information can be combined with position and orientation information, scan angles and calibration information to generate an elevation map. Each target represented in the elevation map can have three-dimensional spatial coordinates (i.e., latitude, longitude, and height) that correspond to a particular point on the Earth's surface from which the beam of light was reflected back to the LIDAR system. In one example, the aircraft can perform topographic LIDAR to map surface characteristics of land using a near infrared laser. As another example, the aircraft can perform bathymetric LIDAR to measure seafloor and riverbed elevations using a water-penetrating laser. In general, LIDAR can be used for a variety of applications, including agriculture, archeology, military, mining, space flight, surveying, and others.

In one configuration, the LIDAR system can use a time to digital converter (TDC) device to measure a time interval between a start event and a stop event, such as the emission of a light pulse and a subsequent reception of the light pulse, respectively. The TDC device can create a digital time representation of the time interval between the start event and the stop event. In other words, the TDC device can be used for recognizing events and providing the digital representation of the time that the events occurred. The time interval can also be known as a light pulse arrival time. In one example, the TDC device can be a counter that measures the time interval by incrementing every clock cycle. Since the measurement is an integer number of clock cycles, the measurement can be quantized to a clock period. Increasing the number of clock cycles can result in a finer resolution (i.e., a time interval with increased accuracy). In one example, a 10 megahertz (MHz) clock has a resolution of 100 nano seconds (ns).

Alternatively, the LIDAR system can include a readout integrated circuit (ROIC), as part of a vision system, that uses one or more analog ramps (e.g., linear voltage ramps) for determining the time interval between the start event and the stop event. In other words, the multiple analog ramps can be used to determine the pulse arrival time (which can be used to calculate the range of the target). In some embodiments, analog ramps can offer greater accuracy compared to TDC devices (or counters). The multiple analog ramps can be a function of voltage over time (or range). The analog ramps can include at least one slow ramp and two fast ramps. The slow ramp can monotonically increase from approximately 0 volts, whereas the two fast ramps have a defined periodicity.

In one example, the slow ramp can start (i.e., a slow ramp voltage starts to monotonically increase over time from approximately 0 volts) when a light pulse is emitted from a laser. The laser can be captured in a start pulse detector that is included in the ROIC. In an alternative example, the slow ramp can increase when the light pulse is emitted directly towards the target. The light pulse emitted from the laser can propagate outward and hit the target. The light pulse can be received as a target reflection. When reception of the reflected light pulse occurs, a specific detector that corresponds to an angle in which the reflected light is received can latch (or save) the ramp voltage levels. A coarse time (i.e., an approximate pulse arrival time) can be calculated from the slow ramp using a predefined formula. In other words, the analog ramps can be previously calibrated so that a particular slow ramp voltage level corresponds to a defined coarse time.

When the slow ramp voltage level has stabilized due to the reception of the light pulse, a slope number associated with the slow ramp voltage level can be identified. The slope number can range from 0 to N, wherein N is an integer. As described in greater detail below, the slope number can indicate one of the at least two fast ramps to use for calculating a fine time. The fine time can provide an additional time increment to improve the accuracy of the coarse time. In a non-limiting example, the course time can range from hundreds of meters to kilometers and the fine time can range from approximately 20 meters to a few hundred meters. The appropriate fast ramp (e.g., fast ramp 1 or fast ramp 2) can be selected based on a mathematical function and the slope number. A fine time can be calculated using the selected fast ramp. The coarse time and the fine time can be added to determine a composite time. The composite time can correspond to the pulse arrival time. The composite time can be divided by two times the speed of light in order to determine the range of the target.

For example, the range of the target can be expressed by the equation: Range=$T_{RETURN}$/2C, wherein $T_{RETURN}$ is the time period between the light emission and the received light and C is the speed of light, or $3 \times 10^8$ meters/second.

In one example, noise and/or ramp droop (i.e., slope errors) can lead to the determination of an inaccurate pulse arrival time and/or range of the target. The ramp droop can be caused by voltage or current starvation in a device resulting in a shift of the measured ramp values. The noise and/or ramp droop can cause the slow ramp voltage level to be mapped to an inaccurate slope number. The inaccurate slope number can lead to the calculation of an inaccurate coarse time. In addition, the inaccurate slope number can lead to the calculation of an inaccurate fine time because an inaccurate fast ramp (e.g., a first fast ramp rather than a second fast ramp) can be used to calculate the fine time. The composite time (i.e., the combination of the fine time and the coarse time) can be inaccurate. Therefore, the pulse arrival time calculated from the composite time can be inaccurate because of the noise and/or ramp droop.

As discussed in greater detail below, fast ramp information encoded in the two fast ramps (which, in the example, are approximately 90 degrees out of phase) can be used to modify which of the two fast ramps to use when calculating the composite time, even when the slow ramp voltage level is mapped to the inaccurate slope number. Therefore, inaccuracies in the slope number due to the noise and/or ramp droop can be mitigated by using the fast ramp information to calculate a more accurate slope number compared to not using the fast ramp information. In an example, the LIDAR system can: (1) calculate the slope number ($S_{slow}$) associated with the slow ramp voltage level, wherein the slope number is an integer ranging from 0 to N; (2) calculate a first zone number ($Z_{slow}$) that corresponds to the slope number, wherein the zone number includes an integer from 0 to N; (3) calculate a second zone number ($Z_{fast}$) that corresponds to the slow ramp voltage level using the fast ramp information; (4) calculate an adjusted slope number ($S_{adj}$) by adding the slope number ($S_{slow}$) with a shortest distance between the first zone number ($Z_{slow}$) and the second zone number ($Z_{fast}$); and (5) use the adjusted slope number ($S_{adj}$) for determining the coarse range and which of the two fast ramps to use for determining the fine range. The coarse range and the fine range can be added to determine a composite range, which corresponds to the range of the target.

FIG. 1 is an example illustration 100 of an aircraft 110 (such as an airplane or helicopter) using a laser detection and ranging (LADAR) system 120 to determine a range of an object 140 on the Earth's surface 130. The LADAR system 120 can emit a light pulse towards the object 140. The object 140 can reflect the light pulse back to the LADAR system 120. In other words, the LADAR system 120 can receive a returned light pulse from the object 140. As described in further detail below, the LADAR system 120 can calculate the amount of time taken for the light pulse to reflect onto the object 140 and return back to the aircraft 110. In one example, the LADAR system 120 can calculate the amount of time using multiple analog voltage ramps. The LADAR system 120 can calculate the range (or distance) of the object 140 by multiplying the amount of time by half the speed of light, wherein the speed of light in a vacuum is 299,792,458 meters/second or approximately 1 foot/nanosecond). Alternatively, the LADAR system 120 can emit the light pulse towards the Earth's surface 130 to determine the range of the Earth's surface 130. As another example, the LADAR system 120 can compare the range of the object 140 and the range of the Earth's surface 130 to determine various dimensions (e.g., height) of the object 140.

Figure 2:
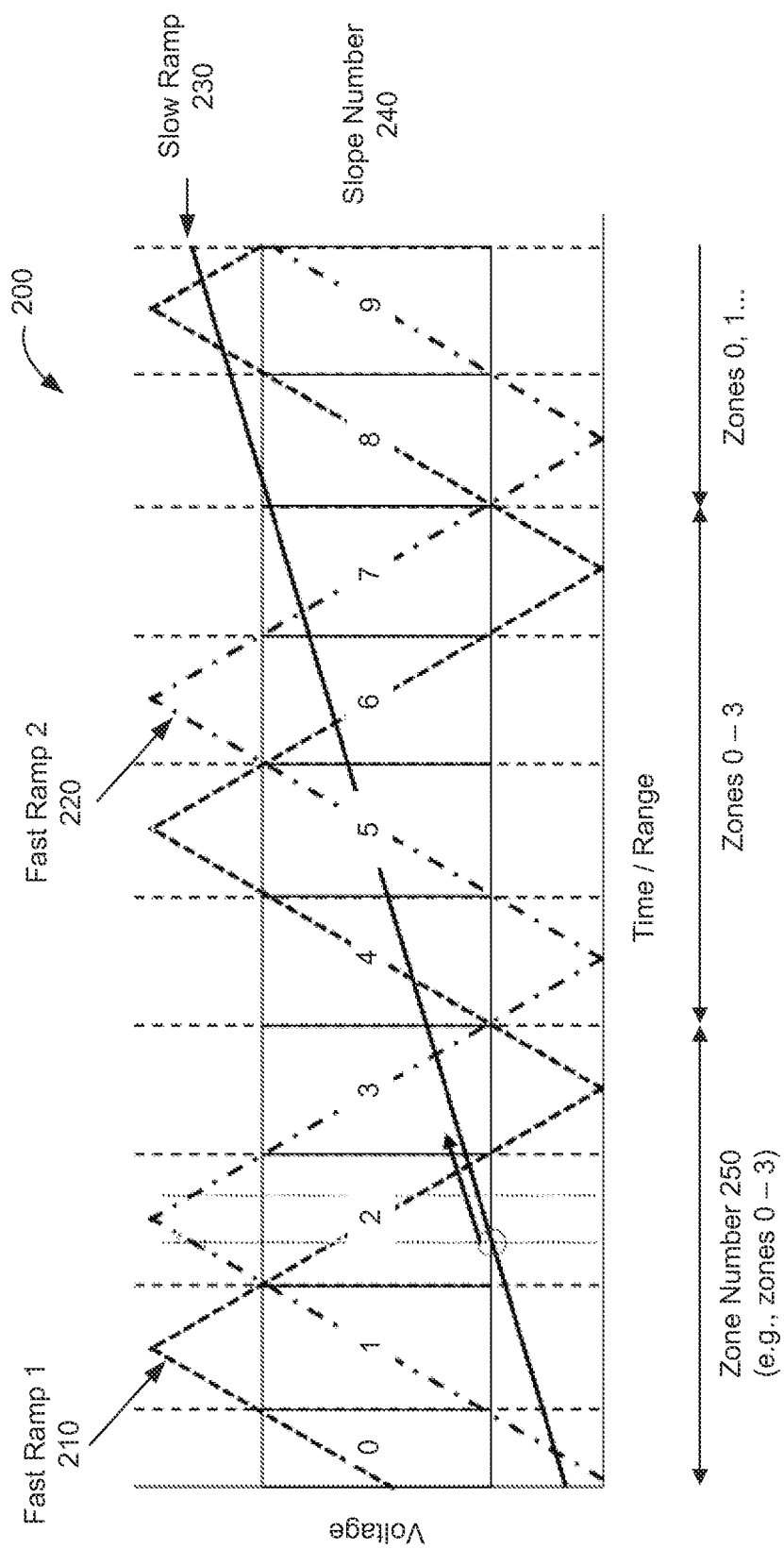
FIG. 2 is an example graphical representation of multiple analog ramps (e.g., a slow ramp and two fast ramps) for determining a range of a target in accordance with an embodiment of the present invention.

FIG. 2 is an example graphical representation 200 of multiple analog ramps used for determining a range of the target and/or an amount of time to receive light reflected from the target. The multiple analog ramps can be used by a readout integrated circuit (ROIC) in a vision system. The target can be an object (e.g., a building), a surface of the Earth, etc. The multiple analog ramps can be a function of voltage over time (or range). The multiple analog ramps can include a slow ramp 230 and two or more fast ramps 210 and 220. The slow ramp 230 can indicate a slow ramp voltage level. The slow ramp voltage level can start at approximately 0 volts and monotonically increase when light is emitted from a laser The light pulse emitted from the laser can propagate outward and hit the target. The light pulse can reflect off the target and return back. The ramp voltage levels can be captured when the light pulse is received as a target reflection.

A coarse time (i.e., an approximate pulse arrival time) can be calculated from the slow ramp voltage level using predefined formulas. In other words, the analog ramps can be previously calibrated so that a particular slow ramp voltage level corresponds to a defined coarse time. Alternatively, the predefined formulas can be used to calculate a coarse range of the target using the slow ramp voltage level.

When the slow ramp voltage level is captured (i.e., when the reflected light pulse is received from the target), a slope number 240 associated with the slow ramp voltage level can be identified. Each slope number 240 can be associated with a defined region of the slow ramp 230. The slope number 240 can range from 0 to N, wherein N is an integer. As shown in the example in FIG. 2, the slope number 240 can range from 0 to 9. Each slope number 240 can include at least one of two fast ramps (i.e., fast ramp 1 210 and fast ramp 2 220). The fast ramps 210 and 220 can have a defined periodicity. For example, the fast ramps 210 and 220 can repeat every four slope numbers 240.

In one configuration, the slow ramp voltage level can map to the slope number 240. The fast ramp (i.e., fast ramp 1 210 or fast ramp 2 220) that is towards the center of the slope number 240 can be selected for calculating a fine time (i.e., a fine increment to the approximate pulse arrival time). In other words, even though both fast ramp 1 210 and fast ramp 2 220 can overlap with a given slope number 240, the fast ramp that is closest to a center region of the slope number 240 is selected. The fine time can provide an additional time increment to improve the accuracy of the coarse time. The fine time can be calculated using the selected fast ramp 210 or 220 and various mathematical formulas. The coarse time and the fine time can be added to determine a composite time. The composite time can correspond to the pulse arrival time (i.e., the amount of time between the emission of the light pulse towards the target and a subsequent reception of the light pulse from the target). The composite time can be multiplied by half the speed of light to determine the range of the target.

As shown in FIG. 2, the slow ramp 230 can indicate the slow ramp voltage level that corresponds to reception of the reflected light pulse from the target. For example, the slow ramp voltage level can be within slope number 2 (as indicated by the unfilled circle). However, noise and/or ramp droop can accumulate to cause the slow ramp voltage level to inaccurately map to slope number 3, rather than slope number 2.

Since the fast ramp 210 or 220 that is closest to the center region of the indicated slope number 240 (or closest to the center of the portion of the slow ramp 230 that is within the slope number 240) can be used for calculating the fine time, the inaccurate slope number 240 can result in the calculation of an inaccurate fast ramp. For example, the inaccurate slope number of 3 can inaccurately indicate fast ramp 2 220 for calculating the fine time. In other words, the inaccurate fast ramp can be selected in error. However, if the slow ramp 230 had been correctly mapped to slope number 2, then fast ramp 1 210 would be the correct fast ramp to use when calculating the fine time. Using the suboptimal fast ramp 210 or 220 can lead to the calculation of a less accurate pulse arrival time and/or range of the target.

Inaccuracies in the slope number 240 due to noise and/or ramp droop can be mitigated by using the additional information encoded in fast ramps 210 and 220. The fast ramp information can be used to modify which of the two fast ramps 210 and 220 to use for calculating the composite time, even when the slow ramp voltage level is incorrectly mapped to the slope number 240 due to the noise and/or ramp droop. In one example, in order to calculate the range to the target using the fast ramp information, approximately five steps can be performed.

In step one, the slope number ($S_{slow}$) 240 associated with the slow ramp voltage level can be identified. The slope number 240 is an integer ranging from 0 to N (e.g., from 0 to 9). The slope number 240 can be calculated as previously described. In the example shown in FIG. 2, the slope number 240 can be 3 since the slow ramp voltage level inaccurately maps to slope number 3 due to the noise.

In step two, a first zone number ($Z_{slow}$) that corresponds to the slope number 240 can be calculated. For example, the slope number of 3 can correspond to a first zone number ($Z_{slow}$) of 3. As shown in FIG. 2, each slope number 240 can correspond to a zone number 250. The zone numbers 250 can range from 0 to N, wherein N is an integer. In one example, the zone numbers 250 can be associated with the periodicity of the fast ramps. For example, slope numbers 0, 1, 2 and 3 can correspond with zone numbers 0, 1, 2 and 3, respectively. However, in slope number 4, the periodicity of the fast ramps can repeat (i.e., the fast ramps in slope number 4 are similar to the fast ramps in slope number 0). Therefore, slope numbers 4, 5, 6 and 7 can correspond with zone numbers 0, 1, 2 and 3, respectively, and so on. In the example shown in FIG. 2, the first zone number ($Z_{slow}$) can be 3 because the slow ramp voltage level inaccurately maps to slope number 3. In other words, slope number 3 can correspond to the first zone number ($Z_{slow}$) of 3.

Figures 3, 4:
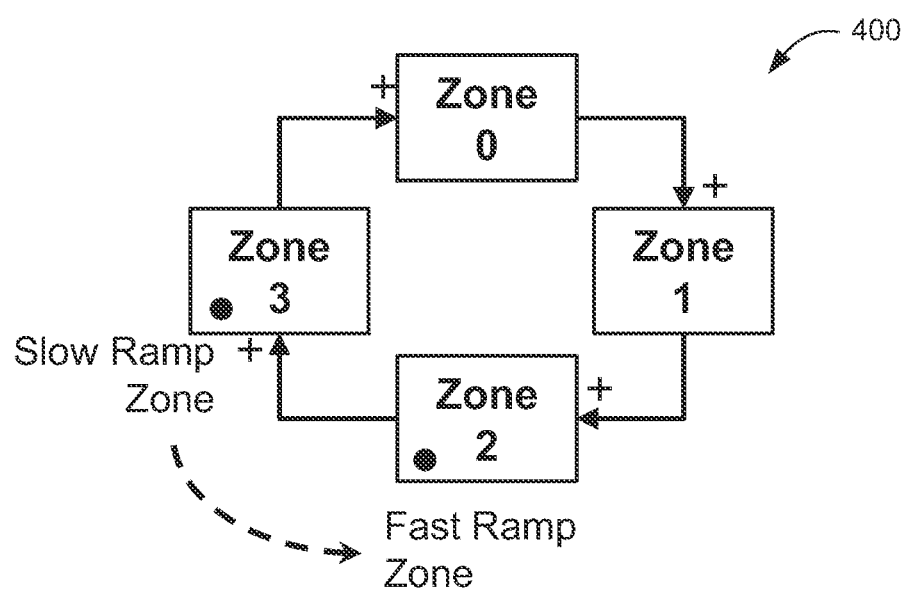
FIG. 3 is an example table with fast ramp information in relation to a plurality of zones for determining a range of a target in accordance with an embodiment of the present invention.
FIG. 4 is an example diagram of a plurality of zones for determining a range of a target in accordance with an embodiment of the present invention.

In step three, a second zone number ($Z_{fast}$) that corresponds to the slow ramp voltage level can be identified using the fast ramp information. With reference to FIGS. 2 and 3, illustrated is an example table 300 with the fast ramp information in relation to the zone numbers 250 (i.e., zone numbers 0, 1, 2 and 3). For a given zone number 250 (e.g., zone number 1), the fast ramp information can indicate the fast ramp (e.g., fast ramp 1 210 or fast ramp 2 220) that is closest to a central region within the zone number 250. In addition, the fast ramp information can indicate for the given zone number 250, whether the fast ramp (e.g., fast ramp 1 210 or fast ramp 2 220) that is not closest to the central region within the zone number is located above or below the fast ramp that is closest to the central region within the zone number 250.

For example, the table 300 indicates that for zone number 0, fast ramp 1 210 is closest to the central region within zone number 0, and fast ramp 2 220 (i.e., the fast ramp that is not closest to the central region within the zone number 0) is located below fast ramp 1 210. In addition, the graphical representation 200 corroborates that fast ramp 1 210 is located towards the center of zone number 0 and that fast ramp 2 220 is located below fast ramp 1 210. In zone number 1, fast ramp 2 220 is closest to the central region within zone number 1, and fast ramp 1 210 (i.e., the fast ramp that is not closest to the central region within the zone number 1) is located above fast ramp 2 220. In zone number 2, fast ramp 1 210 is closest to the central region within zone number 2, and fast ramp 2 220 (i.e., the fast ramp that is not closest to the central region within the zone number 2) is located above fast ramp 1 210. In zone number 3, fast ramp 2 220 is closest to the central region within zone number 3, and fast ramp 1 210 (i.e., the fast ramp that is not closest to the central region within the zone number 1) is located below fast ramp 2 220. The two ramp table is shown for simplicity; higher numbers of fast ramps (i.e., three and greater) can be supported but require more complex tables.

The graphical representation 200 can indicate that, in the zone number 250 that contains the slow ramp voltage level (as indicated by the unfilled circle), fast ramp 1 210 is towards the center of the zone number 250 and the other fast ramp (i.e. fast ramp 2 220) is above fast ramp 1 210. These characteristics of the zone number 250 correspond to zone number 2 (as shown in the table 300 from FIG. 3). In other words, the information in the table 300 can be used to resolve the ambiguity of zone number 250 is associated with the slow ramp voltage level (i.e., the unfilled circle). In the example shown in FIG. 2, the second zone number ($Z_{fast}$) can be determined to be zone number 2 based on the slow ramp voltage level and the fast ramp information.

In step four, an adjusted slope number ($S_{adj}$) can be calculated by adding the slope number ($S_{slow}$) with a signed minimum distance between the slow ramp zone number ($Z_{slow}$) and the fast ramp determined zone number ($Z_{fast}$). $Z_{slow}$ can also be known as a first zone number and $Z_{fast}$ can also be known as a second zone number. As shown in FIG. 4, when the first zone number ($Z_{slow}$), such as zone number 3, travels counterclockwise to reach the second zone number ($Z_{fast}$), such as zone number 2, the shortest distance between the first zone number ($Z_{slow}$) and the second zone number ($Z_{fast}$) is a negative distance. When the first zone number ($Z_{slow}$) travels clockwise to reach the second zone number ($Z_{fast}$), the shortest distance between the first zone number ($Z_{slow}$) and the second zone number ($Z_{fast}$) is a positive distance.

In the example shown in FIG. 2, the first zone number ($Z_{slow}$) is 3 and the second zone number ($Z_{fast}$) is 2. Thus, the shortest distance between the slow ramp determined zone number ($Z_{slow}$) and the fast ramp determined zone number ($Z_{fast}$) is −1, as illustrated in diagram 400 in FIG. 4. Therefore, the slope number ($S_{slow}$) of 3 can be added with (−1) to calculate the adjusted slope number ($S_{adj}$), or slope number 2.

In addition, FIG. 4 illustrates the transition from zone 3 to zone 2 when calculating the adjusted slope number. Zone 3 represents the zone number that was incorrectly identified (via the incorrect slope number mapping) from the slow ramp voltage level. Zone 2 represents the accurate zone number to select which of the two fast ramps to use when calculating the fine time. In other examples, the transition can occur from zone 3 to zone 1, zone 3 to zone 0, zone 2 to zone 0, etc. depending on which slope number the slow ramp voltage level was incorrectly mapped to and which fast ramps should be used when calculating the fine time.

In step five, the adjusted slope number ($S_{adj}$), or slope number 2 from the example in FIG. 2, can be used for determining the coarse time. In other words, the adjusted slope number is 2 rather than the inaccurate slope number of 3 that was previously indicated because of the noise and/or ramp droop. In addition, the adjusted slope number ($S_{adj}$) can be used for determining which of the two fast ramps (e.g., fast ramp 1 210 or fast ramp 2 220) to use for calculating the fine time. The fine time can add a fine time increment to the coarse time to improve the accuracy of the coarse time. The composite time (i.e., the coarse time and the fine time added together) can correspond to the pulse arrival time (i.e., the amount of time between the emission of the light pulse towards the target and a subsequent reception of the light pulse from the target). The composite time can be divided by two times the speed of light to determine the range of the target.

In one example, determining the adjusted slope in order to calculate the pulse arrival time can be represented by the equation: $S_{adj}=S_{slow}Z_{slow} Z_{fast}\|$, wherein $S_{adj}$ is the adjusted slope number, $S_{slow}$ is the slope number associated with the slow ramp voltage level, $Z_{slow}$ is a first zone number that corresponds to the slope number, and $Z_{fast}$ is a second zone number that corresponds to the slow ramp voltage level and is calculated using the fast ramp information. In the example shown in FIG. 2, $S_{adj}=3+\|3\rightarrow2\|=3+(-1)=2$. By using the adjusted slope number of 2 (rather than the adjusted slope number of 3 which was identified because of the noise and/or ramp droop), the calculated range of the target can be more accurate compared to not using the adjusted slope number to calculate the range of the target. Thus, inaccuracies in the slope number due to noise and/or ramp droop can be mitigated by determining an adjusted slope number and then using the adjusted slope number to calculate the range of the target.

FIGS. 5A and 5B are examples of pseudo code of an exemplary way of determining a range of a target using multiple analog ramps. The pseudo code can determine a corrected slope identification (ID) number from a previous estimate of the slope ID number. The pseudo code can define a center point for fast ramps 1 and 2. In addition, the pseudo code can calculate a current zone number, calculate fast ramp distances from a center location, calculate a corrected zone number using the fast ramp distances from the center location, and update the current zone number with the corrected zone number. As a result, the corrected slope ID number can be determined. The corrected slope ID number can be used for determining the range of the target (not shown in the pseudo code in FIGS. 5A and 5B).

Figure 6:
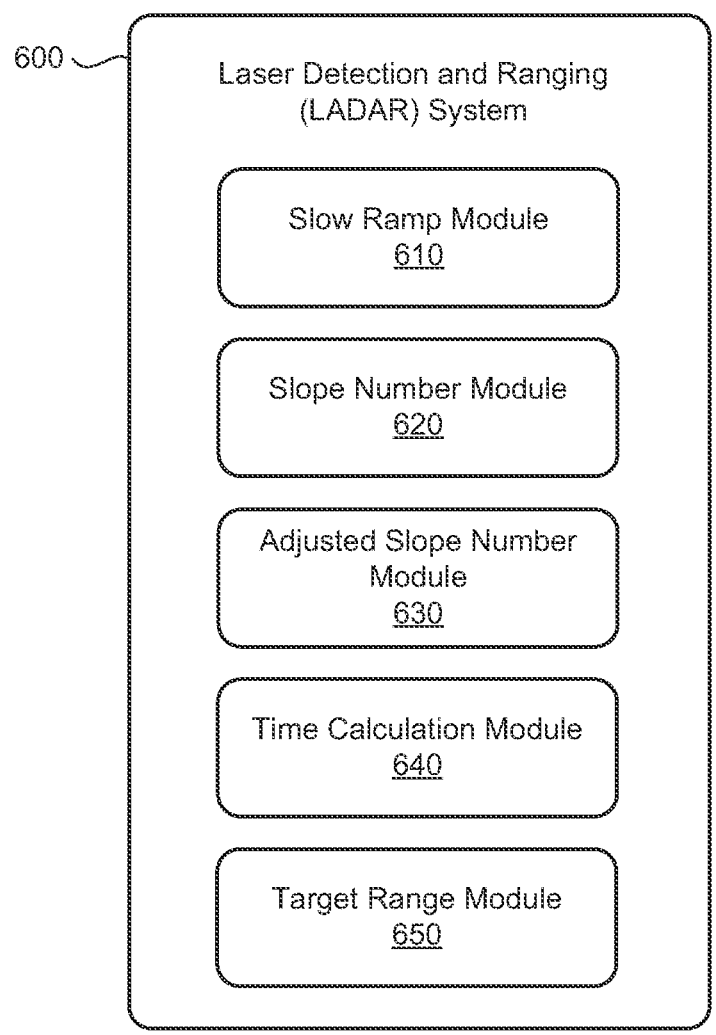
FIG. 6 is an example illustration of a laser detection and ranging (LADAR) system for determining a range of a target using multiple analog ramps in accordance with an embodiment of the present invention.

FIG. 6 illustrates laser detection and ranging (LADAR) range processing 600 for determining a range of a target. In one example, the LIDAR system 600 can be included on a vehicle, such as an aircraft. The LIDAR system 600 can include a slow ramp module 610, a slope number module 620, an adjusted slope number module 630, a time calculation module 640, and a target range module 650. The slow ramp module 610 can be configured to increase a slow ramp voltage level when a light pulse is emitted and stabilize the slow ramp voltage level when the light pulse is received as a target reflection. The slope number module 620 can be configured to determine a slope number associated with the slow voltage ramp, wherein the slope number is an integer ranging from 0 to N. The adjusted slope number module 630 can be configured to determine an adjusted slope number using the slope number associated with the slow voltage ramp and fast ramp information. The time calculation module 640 can be configured to use the adjusted slope number to calculate a coarse time and a fine time, wherein the fine time is calculated using one of at least two fast voltage ramps identified using the adjusted slope number. The target range module 650 can be configured to determine the range of the target using the coarse time, the fine time and a speed of light constant.

In one configuration, the adjusted slope module 630 can be further configured to: calculate a first zone number from a plurality of zone numbers using the slope number associated with the slow voltage ramp, wherein the plurality of zone numbers range from 0 to 3; calculate a second zone number from the plurality of zone numbers using the fast ramp information; and determine the adjusted slope number by adjusting the slope number associated with the slow voltage ramp based on a shortest distance between the first zone number and the second zone number.

In one example, the fast ramp information identifies, for the plurality of zone numbers, which fast voltage ramp is closest proximity to the defined ramp center and whether the alternate fast voltage ramp is located below or above the center location. In addition, the slow voltage ramp and the fast voltage ramps are analog voltage ramps used for detecting a pulse arrival time for a target reflection.

In one configuration, the time calculation module 640 is further configured to determine the coarse time using the adjusted slope number in order to mitigate noise and slope error causing the slow voltage ramp to map to an inaccurate slope number.

In accordance with one exemplary embodiment of the present invention, a method for determining a range of a target is disclosed. The method can comprise initiating a slow voltage ramp that monotonically increases a slow ramp voltage level when a light pulse is emitted from a laser, wherein the light pulse propagates towards the target. The method can also comprise capturing the slow ramp voltage level when receiving the light pulse reflected from the target. The method can further comprise determining a slope number associated with the slow ramp voltage level, wherein the slope number is an integer ranging from 0 to N. The method can also comprise modifying the slope number using fast ramp information to determine an adjusted slope number used for calculating a coarse time. The method can further comprise identifying one of at least two fast voltage ramps using the adjusted slope number, wherein the fast voltage ramps are used to calculate a fine time. The method can comprise adding the coarse time and the fine time to determine a composite time, wherein the composite time represents an arrival time for the light pulse. In addition, the method can comprise determining the range of the target using the composite time and a speed of light constant.

In one configuration, modifying the slope number using fast ramp information can further comprise identifying a first zone number from a plurality of zone numbers using the slope number associated with the slow ramp voltage level, wherein the plurality of zone numbers range from 0 to N; calculating a second zone number from the plurality of zone numbers using the fast ramp information; and determining the adjusted slope number by adjusting the slope number associated with the slow ramp voltage level based on a shortest distance between the slow ramp determined zone number and the fast ramp determined zone number.

In one example, the fast ramp information identifies, for the plurality of zone numbers, a first fast voltage ramp that is in proximity to a center location in the zone number and whether a second fast voltage ramp is located below or above the center location. In addition, the shortest distance between the first zone number and the second zone number is a positive value when the first zone number is less than the second zone number.

In one example, the shortest distance between the first zone number and the second zone number is a negative distance In addition, the slow voltage ramp and the fast voltage ramps are analog voltage ramps used for detecting a pulse arrival time for a target reflection.

In one configuration, the method includes determining the range of the target using at least one of a light detection and ranging (LIDAR) system or a laser detection and ranging (LADAR) system. In addition, the method can comprise determining the coarse time using the adjusted slope number in order to mitigate noise and slope error causing the slow ramp voltage level to map to an inaccurate slope number. In one example, the method can comprise determining the range of the target using a vision system readout integrated circuit (ROIC).

Various techniques, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, or other medium for storing electronic data. The base station and mobile station can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, application-specific integrated circuits, programmable logic devices or the like.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for determining a range of a target, the method comprising:
   initiating a slow voltage ramp that monotonically increases a slow ramp voltage level when a light pulse is emitted from a laser, wherein the light pulse propagates towards the target;
   capturing the slow ramp voltage level when receiving the light pulse reflected from the target;
   determining a slope number associated with the slow ramp voltage level, wherein the slope number is an integer ranging from 0 to N;
   modifying the slope number using fast ramp information to determine an adjusted slope number used for calculating a coarse time;
   identifying one of at least two fast voltage ramps using the adjusted slope number, wherein the fast voltage ramps are used to calculate a fine time;
   adding the coarse time and the fine time to determine a composite time, wherein the composite time represents an arrival time for the light pulse; and
   determining the range of the target using the composite time and a speed of light constant.

2. The method of claim 1, wherein modifying the slope number using fast ramp information further comprises:
   identifying a first zone number from a plurality of zone numbers using the slope number associated with the slow ramp voltage level, wherein the plurality of zone numbers range from 0 to N;
   calculating a second zone number from the plurality of zone numbers using the fast ramp information; and
   determining the adjusted slope number by adjusting the slope number associated with the slow ramp voltage level based on a shortest distance between the first zone number and the second zone number.

3. The method of claim 2, wherein the fast ramp information identifies, for the plurality of zone numbers, a first fast voltage ramp that is in proximity to a center location in the zone number and whether a second fast voltage ramp is located below or above the center location.

4. The method of claim 2, wherein the shortest distance between the first zone number and the second zone number is a positive value when the first zone number is less than the second zone number.

5. The method of claim 2, wherein the shortest distance between the first zone number and the second zone number is a negative value when the first zone number is greater than the second zone number.

6. The method of claim 1, wherein the slow voltage ramp and the fast voltage ramps are analog voltage ramps used for detecting a pulse arrival time for a target reflection.

7. The method of claim 1, further comprising determining the range of the target using at least one of a light detection and ranging (LIDAR) system or a laser detection and ranging (LADAR) system.

8. The method of claim 1, further comprising determining the coarse time using the adjusted slope number in order to mitigate noise and slope error causing the slow ramp voltage level to map to an inaccurate slope number.

9. A method for determining a range of a target using multiple analog ramps, the method comprising:
   identifying a slow ramp voltage level that indicates an approximate arrival time for a light pulse to be received as a target reflection after propagating towards the target;
   determining a slope number associated with the slow ramp voltage level, wherein the slope number is an integer ranging from 0 to N;
   calculating an adjusted slope number using the slope number and fast ramp information;
   determining a coarse range and a fine range of the target using the adjusted slope number; and
   calculating the range of the target by adding the coarse range and the fine range.

10. The method of claim 9, wherein the slow ramp voltage level monotonically increases the slow ramp voltage level when the light pulse is emitted from a laser, wherein the light pulse propagates towards the target.

11. The method of claim 9, wherein the slow ramp voltage level stabilizes when the light pulse is received from the target.

12. The method of claim 9, wherein calculating the adjusted slope number further comprises:

identifying a first zone number from a plurality of zone numbers using the slope number associated with the slow voltage ramp;

calculating a second zone number from the plurality of zone numbers using the fast ramp information, wherein the first zone number and the second zone number are integers ranging from 0 to 3; and determining the adjusted slope number by adjusting the slope number associated with the slow voltage ramp based on a shortest distance between the first zone number and the second zone number.

13. The method of claim 12, wherein the fast ramp information identifies, for the plurality of zone numbers, a first fast voltage ramp that is in proximity to a center location in the zone number and whether a second fast voltage ramp is located below or above the center location.

14. The method of claim 9, further comprising calculating the fine range of the target using the adjusted slope number to select one of at least two fast voltage ramps.

15. The method of claim 9, further comprising determining the range of the target using laser detection and ranging (LADAR).

16. The method of claim 9, further comprising determining the modified coarse time using the adjusted slope number in order to mitigate noise and ramp droop causing the slow voltage ramp to map to an inaccurate slope number.

17. The method of claim 9, further comprising determining the range of the target using multiple analog ramps in a Vernier timing system.

18. A light detection and ranging (LIDAR) system for determining a range of a target, the LIDAR system comprising:

a slow ramp module configured to increase a slow ramp voltage level when a light pulse is emitted and stabilize the slow ramp voltage level when the light pulse is received as a target reflection;

a slope number module configured to determine a slope number associated with the slow voltage ramp, wherein the slope number is an integer ranging from 0 to N;

an adjusted slope number module configured to determine an adjusted slope number using the slope number associated with the slow voltage ramp and fast ramp information;

a time calculation module configured to use the adjusted slope number to calculate a coarse time and a fine time, wherein the fine time is calculated using one of at least two fast voltage ramps identified using the adjusted slope number; and a target range module configured to determine the range of the target using the coarse time, the fine time and a speed of light constant.

19. The LIDAR system of claim 18, wherein the adjusted slope module is further configured to:

calculate a first zone number from a plurality of zone numbers using the slope number associated with the slow voltage ramp, wherein the plurality of zone numbers range from 0 to 3;

calculate a second zone number from the plurality of zone numbers using the fast ramp information; and determine the adjusted slope number by adjusting the slope number associated with the slow voltage ramp based on a shortest distance between the first zone number and the second zone number.

20. The LIDAR system of claim 19, wherein the fast ramp information identifies, for the plurality of zone numbers, a first fast voltage ramp that is in proximity to a center location and whether a second fast voltage ramp is located below or above the center location.

21. The LIDAR system of claim 18, wherein the slow voltage ramp and the fast voltage ramps are analog voltage ramps used for detecting a pulse arrival time for a target reflection.

22. The LIDAR system of claim 18, wherein the time calculation module is further configured to determine the coarse time using the adjusted slope number in order to mitigate noise and slope error causing the slow voltage ramp to map to an inaccurate slope number.

* * * * *